US012077364B2

(12) United States Patent
Huang

(10) Patent No.: US 12,077,364 B2
(45) Date of Patent: Sep. 3, 2024

(54) ELECTRIC PUMP-TYPE PACKAGING TUBE FOR TOOTHPASTE

(71) Applicant: ANHUI JND PLASTIC PACKAGING CO., LTD., Anhui (CN)

(72) Inventor: Yixin Huang, Anhui (CN)

(73) Assignee: ANHUI JND PLASTIC PACKAGING CO., LTD., Huainan (CN)

(*) Notice: Subject to any disclaimer, the term of this patent is extended or adjusted under 35 U.S.C. 154(b) by 463 days.

(21) Appl. No.: 17/563,278

(22) Filed: Dec. 28, 2021

(65) Prior Publication Data

US 2022/0119190 A1 Apr. 21, 2022

Related U.S. Application Data

(63) Continuation of application No. PCT/CN2019/101683, filed on Aug. 21, 2019.

(30) Foreign Application Priority Data

Jun. 28, 2019 (CN) ......................... 201910576451.2
Jun. 28, 2019 (CN) ......................... 201910578250.6
(Continued)

(51) Int. Cl.
*B65D 83/00* (2006.01)
*A45D 40/00* (2006.01)
*B05B 11/02* (2023.01)

(52) U.S. Cl.
CPC ......... *B65D 83/0005* (2013.01); *A45D 40/00* (2013.01); *B05B 11/02* (2013.01); *A45D 2200/055* (2013.01)

(58) Field of Classification Search
CPC .............. A45D 40/00; A45D 2200/055; B65D 83/0005; B05B 11/02
See application file for complete search history.

(56) References Cited

U.S. PATENT DOCUMENTS 4,479,592 A 10/1984 Rusing et al.

FOREIGN PATENT DOCUMENTS

CN 200970193 Y 11/2007
CN 101817428 A 9/2010
(Continued)

OTHER PUBLICATIONS

International Search Report of PCT Patent Application No. PCT/CN2019/101683 issued on Mar. 20, 2020.

*Primary Examiner* — Paul R Durand
*Assistant Examiner* — Randall A Gruby

(57) ABSTRACT

An electric pump-type packaging tube for toothpaste, including a columnar storage cavity and a piston electric driving device provided therein; one end of the storage cavity is a discharge port, and the other end is sealed by a piston; the piston electric driving device is used for driving the piston to move a distance towards the discharge port and then stop moving; the electric pump-type packaging tube specifically is an integral packaging tube, a two-segment packaging tube, or an integral push-rod type packaging tube, and includes a tube body; the tube body includes a nozzle segment and a main body segment; the nozzle segment and the internal cavity of the main body segment together constitute the storage cavity; or the internal wall of the nozzle segment extends to form an extension tube, and the nozzle segment and the internal cavity of the extension tube together constitute the storage cavity.

22 Claims, 15 Drawing Sheets

(30) Foreign Application Priority Data

Jun. 28, 2019 (CN) ......................... 201910578267.1
Jun. 28, 2019 (CN) ......................... 201910578269.0

(56) References Cited

FOREIGN PATENT DOCUMENTS

| | | | | |
|---|---|---|---|---|
| CN | 201737324 U | | 2/2011 | |
| CN | 203512359 U | | 4/2014 | |
| CN | 204872170 U | | 12/2015 | |
| CN | 106043964 A | | 10/2016 | |
| CN | 206654378 U | | 11/2017 | |
| CN | 108557277 A | | 9/2018 | |
| CN | 208217372 U | | 12/2018 | |
| WO | WO-2015117545 A1 | * | 8/2015 | ........... A47K 5/1211 |

* cited by examiner

ELECTRIC PUMP-TYPE PACKAGING TUBE FOR TOOTHPASTE

CROSS-REFERENCE TO RELATED APPLICATION

The present application is a continuation of international application of PCT application No. PCT/CN2019/101683 filed on Aug. 21, 2019, which claims the priority to Chinese patent application No. 201910578267.1, No. 201910578269.0, No. 201910578250.6 and No. 201910576451.2, all filed on Jun. 28, 2019. The entirety of the above-mentioned patent application is hereby incorporated by reference herein and made a part of this specification.

TECHNICAL FIELD

The present application relates to the technical filed of packaging, in particular to an electric pump-type packaging tube for toothpaste.

BACKGROUND ART

It is well-known that in the existing packaging technology, paste daily chemical products such as toothpaste and face cream are generally packaged in a tube, and can be used after a tube cover is opened and a paste is squeezed outwards. However, it is often inconvenient to squeeze the tube and difficult to fully squeeze out the paste, which results serious waste.

Therefore, it is of great significance to study a packaging bottle for paste, which is convenient and flexible to use and avoids waste.

SUMMARY

The present application aims to solve the problem that a packaging tube for paste in the existing technology is inconvenient to squeeze by hand and the paste is difficult to squeeze out fully, and provides an electric pump-type packaging tube for toothpaste.

In order to achieve the above objects, the present application adopts the following technical solution.

The electric pump-type packaging tube for toothpaste, including a columnar storage cavity and a piston electric driving device provided therein. One end of the storage cavity is a discharge port, and the other end is sealed by a piston. The piston electric driving device is used for driving the piston to move a distance towards the discharge port and then stop moving.

As the Preferred Solutions:

the electric pump-type packaging tube for toothpaste as described above, includes four structures: a) an integral packaging tube, b) a two-segment packaging tube, c) an integral push-rod type packaging tube and d) a three-segment push-rod type packaging tube. These four kinds of structures will be described in detail below.

The description of a) integral packaging tube is as follows.

The electric pump-type packaging tube for toothpaste as described above, which is the integral packaging tube, and includes a tube body. The tube body includes a nozzle segment, a main body segment and a tail segment. A first end of the nozzle segment is provided with an opening, and a second end of the nozzle segment is connected with the first end of the main body segment, and the second end of the main body segment is connected with the first end of the tail segment. The nozzle segment and the main body segment are formed integrally. Internal cavities of the nozzle segment and the main body segment together constitute the storage cavity, and the opening at the first end of the nozzle segment is the discharge port. The piston is provided with the main body segment, and they are in an interference fit. The piston electric driving device, which is connected with the tail segment, is used for driving the piston to move a distance towards the nozzle segment and then stop moving. When the integral packaging tube in the present application is used, it can be achieved that the piston moves a distance from the tail segment to the nozzle segment and then stops moving by opening the piston electric driving device provided in the tail segment. Because the interference fit between the piston and the main body, a certain amount of filler in the tube can be squeezed out. During the whole process, it only needs to turn on the switch of the piston electric driving device, which effectively solves the problem of inconvenient operation and not-fully squeezing out in the traditional manual squeezing method.

The electric pump-type packaging tube for toothpaste as described above, in which a surface of the piston facing away from the nozzle segment forms a part of a wall surface of an airtight chamber. The piston electric driving device includes a pressurization device, a pressure relief device and a control device. The pressurization device is used for increasing pressure in the airtight chamber, and the pressure relief device is used for releasing the pressure in the airtight chamber, and the control device is used for controlling the opening and closing of the pressurization device and the pressure relief device. When the control device is in a first working state, the pressure relief device is closed to stop releasing pressure, and the pressurization device is opened to start increasing pressure. When the control device is in a second working state, the pressure relief device is opened to start releasing pressure, and the pressurization device is closed to stop increasing pressure. Because the piston is pushed to move by increasing pressure in the present application, it needs to rapidly release the pressure in the present application. Otherwise, when it needs to stop squeezing the filler out, the piston will continue to move up, so that it is unable to stop squeezing the filler out and results in a lot of waste.

The electric pump-type packaging tube for toothpaste as described above, in which a baffle is provided at or near the first end of the tail segment, and the baffle, the piston and the tube body enclose the airtight chamber. The airtight chamber is not necessarily surrounded by the baffle, the piston and the tube body together. For example, in an original state, the baffle contacts with the piston, and the piston and the baffle can directly enclose the airtight chamber. With the piston moving up, the piston moves away from the baffle. At this time, the tube body begins to participate in the structure of the airtight chamber, and the baffle, the piston and the tube body together enclose the airtight chamber.

The electric pump-type packaging tube for toothpaste as described above, in which the piston electric driving device is provided in the tail segment. The piston electric driving device mainly functions by increasing the pressure in the airtight chamber and releasing the pressure in time, thus the piston electric driving device can be provided outside of the tail segment, as long as it can be effectively communicated with the airtight chamber. However, the overall structure has a large volume, so that it is not easy to be store, and the piston electric driving device is easy to be damaged when placed outside. Therefore, it is preferred to provide the piston electric driving device in the tail segment.

The electric pump-type packaging tube for toothpaste as described above, in which the pressurization device is a booster pump, which is a gas booster pump or a liquid booster pump. The pressure relief device is a pressure relief valve. Only some common pressurization devices and pressure relief devices are listed here, and other devices that can play functions of pressure increasing and pressure releasing also can be applied in the present application.

The electric pump-type packaging tube for toothpaste as described above, in which the baffle is provided with a drain inlet and a drain outlet. The second end of the tail segment is an opening end, or a closing end provided with a through hole; or the second end of the tail segment is the closing end, and a tube wall of the tail segment is provided with the through hole at the same time. The tail segment is provided in this way to mainly ensure its communication with the outside, so that fluid in the airtight chamber can be discharged in time during pressure relief. If the tail segment is airtight space, the fluid in the airtight chamber will flow to the tail segment. With the increasing of the pressure in the tail segment, it is difficult to continue to discharge the fluid in the airtight chamber. An outlet of the booster pump is communicated with the drain inlet, and the pressure relief valve is used for controlling the opening and closing of the drain outlet.

The electric pump-type packaging tube for toothpaste as described above, in which the control unit mainly includes a power supply unit and a control unit, which are connected with each other. The power supply unit is an electric source or a battery, and used to supply power to the pressurization device and the pressure relief device. The control unit is connected with the pressurization device and the pressure relief device, and used for controlling a connection state of the power supply unit with the pressurization device and the pressure relief device. The connection state is connected or disconnected, so that the opening and closing of the pressurization device and the pressure relief device are controlled.

The control unit includes an induction disk, an integrated circuit IC2 and a field effect transistor Q1. When the induction disk receives induction, the integrated circuit IC2 and the field effect transistor Q1 are controlled to connect the power supply unit with the pressurization device and the pressure relief device, so as to control to open the pressurization device and close the pressure relief device. When the induction disk does not receive the induction, the integrated circuit IC2 and the field effect transistor Q1 are controlled to disconnect the power supply unit with the driving device, so as to control to close the pressurization device and open the pressure relief device.

The electric pump-type packaging tube for toothpaste as described above, in which the electric source or the battery is connected with a charging circuit. The control unit is provided at the tail segment, or also can be provided at the main body segment or the nozzle segment. The main body segment and the nozzle segment are formed integrally, and both are detachably connected with the tail segment. Therefore, when the control unit is provided at the main body segment or the nozzle segment, special conductive materials need to be respectively provided at the main body segment, the nozzle segment and the tail segment, so that when the main body segment and the nozzle segment are connected with the tail segment, the conductive materials are conducted, and the control unit is respectively connected with the power supply unit, the pressurization device and the pressure relief device.

The electric pump-type packaging tube for toothpaste as described above, in which the second end of the main body segment is detachably connected with the first end of the tail segment. The detachable connection between the main body segment and the tail segment can help to reduce the cost. The filler is filled in the main body segment, when the filler is exhausted, the main body segment needs to be replaced. Because the nozzle segment and the main body segment are formed integrally, the nozzle segment needs to be replaced at the same time. If the tail segment and the main body segment are formed integrally, the tail segment and the piston electric driving device in the tail segment also need to be replaced at the same time. The cost is higher. However, when the tail segment is designed to be detachably connected with the main body segment, there is no need to replace the tail segment and the piston electric driving device, which greatly reduces the cost.

The electric pump-type packaging tube for toothpaste as described above, also includes a tube cover and a tube cap. The tube cover includes a lower cover and an upper cover, and the lower cover is hollow tubular shape with both ends open, and the upper cover and the tube cap are hollow tubular shape with one end open and the other end closed. The upper cover is rotatably connected with the lower cover, which is detachably connected with the nozzle segment, and the tube cap is detachably connected with a connection part between the nozzle segment and the main body segment.

The description of b) two-segment packaging tube is as follows.

The electric pump-type packaging tube for toothpaste as described above, which is the two-segment packaging tube, includes the tube body. The tube body includes a nozzle segment, the main body segment and the tail segment. The first end of the nozzle segment is provided with the opening, and the second end of the nozzle segment is connected with the first end of the main body segment, and the second end of the main body segment is connected with the first end of the tail segment. The nozzle segment is detachably connected with the main body segment. An inner wall of the nozzle segment extends from the second end of the nozzle segment to the second end of the main body segment to form an extension tube provided in the main body segment. The internal cavities of the nozzle segment and the extension tube together constitute the storage cavity, and the opening at the first end of the nozzle segment is the discharge port. The piston is provided in the extension tube, and the piston and the extension tube form an interference fit. The piston electric driving device, which is connected with the tail segment, is used for driving the piston to move a distance towards the nozzle segment and then stop moving.

The packaging tube in the present application includes two segments. A first segment is the whole forming by connecting the nozzle segment of the tube body with the extension tube. A second segment is the whole forming by connecting the main body segment and the tail segment of the tube body. The two-segment structure has great popularization value. The first segment is used to accommodate the filler, and the second segment is used for the mounting of the electric driving device. When the filler in the first segment is exhausted, only need to separate the first segment from the second segment, and then replace the first segment to get a new product. During repeated use, the second segment with higher cost does not need to be replaced, and only the first segment with lower cost needs to be replaced, which greatly reduces the cost. The using process of the two-segment packaging tube is the same as that of the integral packaging tube.

The electric pump-type packaging tube for toothpaste as described above, in which the surface of the piston facing away from the nozzle segment forms a part of the wall surface of the airtight chamber. The piston electric driving device includes the pressurization device, the pressure relief device and the control device. The pressurization device is used for increasing the pressure in the airtight chamber, and the pressure relief device is used for releasing the pressure in the airtight chamber, and the control device is used for controlling the opening and closing of the pressurization device and the pressure relief device. When the control device is in a first working state, the pressure relief device is closed to stop releasing the pressure, and the pressurization device is opened to start increasing the pressure. When the control device is in a second working state, the pressure relief device is opened to start releasing the pressure, and the pressurization device is closed to stop increasing the pressure. Because the piston is pushed to move by increasing the pressure in the present application, it needs to rapidly release the pressure in the present application. Otherwise, when it needs to stop squeezing the filler out, the piston will continue to move up, so that it is unable to stop squeezing the filler out and results in a lot of waste.

The electric pump-type packaging tube for toothpaste as described above, in which a baffle is provided at or near the first end of the tail segment. The connection part between the tail segment and the baffle is recessed towards the second end of the tail segment to form a groove, and the extension tube is inserted into the groove. The baffle, the piston and the extension tube enclose the airtight chamber. The airtight chamber is not necessarily surrounded by the baffle, the piston and the extension tube. In an initial state, when the piston contacts with the baffle, the piston and the extension tube can enclose the airtight chamber. With the piston moving up, the piston moves away from the baffle, and the baffle, the piston and the extension tube together enclose the airtight chamber at this time. If one end of the extension tube is not flush with the baffle, that is, one end of the extension tube is located above the baffle, the extension tube, the tube body segment, the baffle and the piston together enclose the airtight chamber at this time.

The electric pump-type packaging tube for toothpaste as described above, in which the piston electric driving device is provided in the tail segment. The piston electric driving device mainly functions by increasing the pressure in the airtight chamber and releasing the pressure in time, thus the piston electric driving device can be provided outside of the tail segment, as long as it can be effectively communicated with the airtight chamber. However, the overall structure has a large volume at this time, so that it is not easy to be store, and the piston electric driving device is easy to be damaged when placed outside. Therefore, it is preferred to provide the piston electric driving device in the tail segment.

The electric pump-type packaging tube for toothpaste as described above, in which the pressurization device is the booster pump, which is the gas booster pump or the liquid booster pump. The pressure relief device is the pressure relief valve. Only some common pressurization devices and pressure relief devices are listed here, and other devices that can play the functions of pressurizing and pressure releasing also can be applied in the present application.

The electric pump-type packaging tube for toothpaste as described above, in which the baffle is provided with a drain inlet and a drain outlet. The second end of the tail segment is the opening end, or the closing end provided with the through hole; or the second end of the tail segment is the closing end, and the tube wall of the tail segment is provided with the through hole at the same time. The tail segment is provided in this way to mainly ensure its communication with the outside, so that the fluid in the airtight chamber can be discharged in time during pressure relief. If the tail segment is airtight space, the fluid in the airtight chamber will flow to the tail segment. With the increasing of the pressure in the tail segment, it is difficult to continue to discharge the fluid in the airtight chamber. The outlet of the booster pump is communicated with the drain inlet, and the pressure relief valve is used for controlling the opening and closing of the drain outlet.

The electric pump-type packaging tube for toothpaste as described above, in which the structure of the control device is the same as or slightly different from that of the integral packaging tube. For example, the structure of the control unit is different. The control unit is a mechanical switch, an infrared switch or a microwave switch. When the switch is turned on, the power supply unit is connected with the pressurization device and the pressure relief device, so as to control to open the pressurization device and close the pressure relief device. When the switch is turned off, the power supply unit is disconnected with the pressurization device and the pressure relief device, so as to control to close the pressurization device and open the pressure relief device.

The electric pump-type packaging tube for toothpaste as described above, in which the electric source or the battery is connected with the charging circuit. The control unit is provided at the main body segment or the tail segment, or also can be provided at the nozzle segment. Because connection structure between the main tail segment and the tail segment is not affected when the extension tube is replaced, the control unit can be not only provided at the main body segment, but also provided at the tail segment. But the nozzle segment is detachably connected with the main tube segment, when the extension tube is replaced, the nozzle segment is also replaced. Therefore, when the control unit is provided at the nozzle segment, the special conductive materials need to be respectively provided at the nozzle segment, the main body segment and the tail segment, so that when the nozzle segment is connected with the main body segment and the tail segment, the conductive materials are conducted, and the control unit is respectively connected with the power supply unit, the pressurization device and the pressure relief device.

The electric pump-type packaging tube for toothpaste as described above, in which the main body segment and the tail segment are formed integrally, it also can be that the second end of the main body segment is detachably connected with the first end of the tail segment.

The electric pump-type packaging tube for toothpaste as described above, also includes the tube cover and the tube cap. The tube cover includes the lower cover and the upper cover, and the lower cover is hollow tubular shape with both ends open, and the upper cover and the tube cap are hollow tubular shape with one end open and the other end closed. The upper cover is rotatably connected with the lower cover, which is detachably connected with the nozzle segment, and the tube cap is detachably connected with the connection part between the nozzle segment and the main body segment.

The description of c) integral push-rod type packaging tube is as follows.

The electric pump-type packaging tube for toothpaste as described above, which is the integral push-rod type packaging tube, includes a tube body. The tube body includes the nozzle segment, the main body segment and the tail segment. The first end of the nozzle segment is provided with the opening, and the second end of the nozzle segment is connected with the first end of the main body segment, and the second end of the main body segment is connected with the first end of the tail segment. The nozzle segment and the main body segment are formed integrally. The internal cavities of the nozzle segment and the main body segment together constitute the storage cavity, and the opening at the first end of the nozzle segment is the discharge port. The piston is provided in the main body segment, and the piston and the main body segment form an interference fit. The piston electric driving device is a linear actuator mechanism. The linear actuator mechanism is fixed in the tail segment (It may not be completely located in the tail segment, but may partially extends out from the first end or the second end of the tail segment) and includes a pushing rod, which is used for driving the piston to move a distance towards the nozzle segment and then stop moving by the pushing rod. The specific structure of the linear actuator mechanism is not limited, it is within the protection scope of the present application as long as it can drive the piston to move a distance towards the nozzle segment and then stop moving. The linear actuator mechanism specifically is a device which can provide liner motion. It works by utilizing some kind of driving energy and under action of some kind of control signal, and uses liquid, gas, electricity or other energy and converts it into driving action by a motor, a cylinder or other devices. The pushing rod in the linear actuator mechanism may not necessarily be a rod, for example, it also can be a mechanism composed of a rod, a plate or a cylinder. It can be applicable to the present application as long as it can contact with the piston and push the piston to move.

When the integral push-rod type packaging tube in the present application is used, by opening the linear actuator mechanism provided in the tail segment, the piston can be pushed to move a distance from the tail segment to the nozzle segment and then stop moving by the pushing rod. Because the piston and the main body segment are in the interference fit, a certain amount of the filler in the tube can be squeezed out. During the whole process, it only needs to turn on the switch of the linear actuator mechanism, which effectively solves the problem of inconvenient operation and not-fully squeezing out in the traditional manual squeezing method.

The electric pump-type packaging tube for toothpaste as described above, in which the linear actuator mechanism mainly includes a control device, a driving device and the pushing rod. The control device is used for controlling the opening and closing of the driving device, which is used to drive the pushing rod to move along a straight line. The connection structure between the driving device and the pushing rod can refer to the existing technology, such as an electric linear actuator, which is a new type of electric actuators. The electric linear actuator is a new type of linear actuator mechanisms mainly consisting of the motor, a pusher, the control device and etc, which can realize remote control and centralized control. After decelerated by a gear or a worm and gear, the motor drives a lead screw and a lead screw nut, which turns a rotating motion of the motor into a linear motion. The motion of the pusher can be completed by using the forward and reverse rotation of the motor, for example, referring to a linear motor, which is a transmission device directly converting the electric energy into the liner motion mechanical energy without any intermediate conversion mechanism, it can be regarded as a rotating motor cut radially and developed into a plane.

The electric pump-type packaging tube for toothpaste as described above, in which the piston includes a piston body, an inserting tube and multiple inserting plates. The piston body is cylindrical structure with one end closed and the other end open, and the specific shape is not limited. It can be a cylinder, a frustum of a cone, an irregular shape cylinder and etc, which depends on the shape of the main body segment of the tube body. That is, the shape of the piston body needs to ensure it and the main body segment of the tube body can be in the interference fit, so as to ensure that the filler in the tube body is sealed. The closing end and the opening end of the piston body are respectively close to the first end and the second end of the main body segment. The inserting tube is inserted in the piston body, and is connected with the closing end of the piston body. The inserting plates are inserted in the piston body, and in which two opposite thickness surfaces are respectively connected with the inner wall of the piston body and an outer wall of the inserting tube. The inserting plates are mainly used to fix the inserting tube, and the number and arrangement of the inserting plates are not limited. For example, three inserting plates are evenly arranged around a circumference of the inserting tube, or more or fewer inserting plates are evenly arranged or non-evenly arranged around the circumference of the inserting tube.

The electric pump-type packaging tube for toothpaste as described above, in which the pushing rod, which is a straight rod, is provided on the same line with the inserting tube, and the diameter of the pushing rod is less than an inner diameter of the inserting tube. The diameter of the pushing rod is less than an inner diameter of the inserting tube, which is the case when both the pushing rod and the inserting tube are the cylindrical structure by default. When they are non-cylindrical structure, their dimensional relationship needs to ensure that the pushing rod can be inserted into the inserting tube. In the initial state (i.e. before the linear actuator mechanism starts working), the pushing rod can be inserted into the inserting tube or not. In the initial state, when the pushing rod is inserted into the inserting tube, the pushing rod further moves towards the inserting tube under the driving action of the driving device. In the initial state, when the pushing rod is not inserted into the inserting tube, the pushing rod moves along the straight line under the driving action of the driving device, and will be inserted into the inserting tube and connected with the piston, so as to drive the piston to move towards the nozzle segment. The pushing rod may not necessarily be the straight rod, it can also be a scissors-fork hoisting mechanism formed by a combination of multiple straight rods, or rods with irregular shape, etc.

The electric pump-type packaging tube for toothpaste as described above, in which the baffle is provided at or near the first end of the tail segment, and a rod passing through hole for the pushing rod to pass through is provided on the baffle. Before operation, the pushing rod of the linear actuator mechanism can be located below the rod passing through hole. That is, during the operation of the linear actuator mechanism, the pushing rod contacts with the piston after passing through the rod passing through hole, or pass through the rod passing through hole. At this time, it can play a better guiding role and prevent the pushing rod from deviating from the inserting tube of the piston during the operation of the linear actuator mechanism.

The electric pump-type packaging tube for toothpaste as described above, in which the control device mainly includes the power supply unit and the control unit. The power supply unit is the electric source or the battery, and the control unit is connected with the driving device. The control unit is used for controlling the connection state of the power supply unit with the driving device, and the connection state is connected or disconnected.

The control unit includes the induction disk, the integrated circuit IC2 and the field effect transistor Q1. When the induction disk receives the induction, the integrated circuit IC2 and the field effect transistor Q1 are controlled to connect the power supply unit with the driving device, so as to control to open the driving device, and the pushing rod moves along the straight line. When the induction disk does not receive the induction, the integrated circuit IC2 and the field effect transistor Q1 are controlled to disconnect the power supply unit with the driving device, so as to control to close driving device, and the pushing rod stops moving.

The electric pump-type packaging tube for toothpaste as described above, in which the electric source or the battery is connected with the charging circuit. The control unit is provided at the tail segment, or also can be provided at the main body segment or the nozzle segment. The main body segment and the nozzle segment are formed integrally, and both are detachably connected with the tail segment. Therefore, when the control unit is provided at the main body segment or the nozzle segment, the special conductive materials need to be respectively provided at the main body segment, the nozzle segment and the tail segment, so that when the main body segment and the nozzle segment are connected with the tail segment, the conductive materials are conducted, and the control unit is respectively connected with the power supply unit and the driving device.

The electric pump-type packaging tube for toothpaste as described above, in which the second end of the main body segment is detachably connected with the first end of the tail segment. The detachable connection between the main body segment and the tail segment can help to reduce the cost. The filler is filled in the main body segment, when the filler is exhausted, the main body segment needs to be replaced. Because the nozzle segment and the main body segment are formed integrally, the nozzle segment needs to be replaced at the same time. If the tail segment and the main body segment are formed integrally, the tail segment and the linear actuator mechanism in the tail segment also need to be replaced at the same time. The cost is higher. However, when the tail segment is designed to be detachably connected with the main body segment, there is no need to replace the tail segment and the linear actuator mechanism, which greatly reduces the cost.

The electric pump-type packaging tube for toothpaste as described above, also includes the tube cover, the tube cap and a closing sheet. The tube cover includes the lower cover and the upper cover, and the lower cover is hollow tubular shape with both ends open, and the upper cover and the tube cap are hollow tubular shape with one end open and the other end closed. The upper cover is rotatably connected with the lower cover, which is detachably connected with the nozzle segment. The tube cap is detachably connected with a connection part between the nozzle segment and the main body segment, and the closing sheet is detachably connected with the second end of the tail segment.

The description of d) three-segment push-rod type packaging tube is as follows.

The electric pump-type packaging tube for toothpaste as described above, which is the three-segment push-rod type packaging tube, includes an outer tube and an inner tube.

The outer tube includes the nozzle segment, the main body segment and the tail segment. The first end of the nozzle segment is provided with the opening, and the second end of the nozzle segment is detachably connected with the first end of the main body segment, and the second end of the main body segment is connected with the first end of the tail segment (both are formed integrally, or detachably connected with each other).

The inner tube is provided in the nozzle segment and the main body segment, and the piston is provided in the inner tube. The second end of the inner tube is sealed by the piston, and the first end is detachably connected with the nozzle segment, and communicated with the opening at the first end of the nozzle segment. The internal cavities of the nozzle segment and the main body segment together constitute the storage cavity, and the opening at the first end of the nozzle segment is the discharge port.

The packaging tube in the present application includes three segments. The first segment is the nozzle segment, and the second segment is the main segment and the tail segment connected with the main segment, and a third segment is the inner tube. The three-segment structure has great popularization value. The first segment is used to transitionally connected the second segment and the third segment. The second segment is used for the mounting of the linear actuator mechanism. The third segment is used to accommodate the filler. When the filler in the third segment is exhausted, only need to separate the first segment from the second segment first, and then separate the first segment from the third segment, and finally replace the new inner tube, that is the third segment, to get a new product. During repeated use, the first segment and the second segment do not need to be replaced, and only the third segment needs to be replaced, which greatly reduces the cost.

The piston electric driving device is the linear actuator mechanism. The linear actuator mechanism is fixed in the tail segment (It may not be completely located in the tail segment, but may partially extends out from the first end or the second end of the tail segment) and includes a pushing rod, which is used for driving the piston to move a distance towards the nozzle segment and then stop moving by the pushing rod. The specific structure of the linear actuator mechanism is not limited, it is within the protection scope of the present application as long as it can drive the piston to move a distance towards the nozzle segment and then stop moving. The linear actuator mechanism specifically is a device which can provide liner motion. It works by utilizing some kind of driving energy and under action of some kind of control signal, and uses liquid, gas, electricity or other energy and converts it into driving action by a motor, a cylinder or other devices. The pushing rod in the linear actuator mechanism may not necessarily be a rod, for example, it also can be a mechanism composed of a rod, a plate or a cylinder. It can be applicable to the present application as long as it can contact with the piston and push the piston to move.

When the three-segment push-rod type packaging tube in the present application is used, by opening the linear actuator mechanism provided in the tail segment, the piston can be pushed to move a distance from the tail segment to the nozzle segment and then stop moving by the pushing rod. Because the piston and the inner tube are in the interference fit, a certain amount of the filler in the inner tube can be squeezed out. During the whole process, it only needs to turn on the switch of the linear actuator mechanism, which effectively solves the problem of inconvenient operation and not-fully squeezing out in the traditional manual squeezing method.

The electric pump-type packaging tube for toothpaste as described above, in which the linear actuator mechanism mainly includes the control device, the driving device and the pushing rod. The control device is used for controlling the opening and closing of the driving device, which is used to drive the pushing rod to move along the straight line. The connection structure between the driving device and the pushing rod can refer to the existing technology, such as the electric linear actuator, which is a new type of electric actuators. The electric linear actuator is a new type of linear actuator mechanisms mainly consisting of the motor, the pusher, the control device and etc, which can realize remote control and centralized control. After decelerated by the gear or the worm and gear, the motor drives a lead screw and a lead screw nut, which turns the rotating motion of the motor into the linear motion. The motion of the pusher can be completed by using the forward and reverse rotation of the motor, for example, referring to the linear motor, which is a transmission device directly converting the electric energy into the liner motion mechanical energy without any intermediate conversion mechanism, it can be regarded as a rotating motor cut radially and developed into a plane.

The electric pump-type packaging tube for toothpaste as described above, in which the piston includes the piston body, the inserting tube and multiple inserting plates. The piston body is cylindrical structure with one end closed and the other end open, and the specific shape is not limited. It can be the cylinder, the frustum of the cone, the irregular shape cylinder and etc, which mainly depends on the shape of the inner tube. That is, the shape of the piston body needs to ensure it and the inner tube can be in the interference fit, so as to ensure that the filler in the inner tube is sealed. The closing end and the opening end of the piston body are respectively close to the first end and the second end of the main body segment. The inserting tube is inserted in the piston body, and is connected with the closing end of the piston body. The inserting plates are inserted in the piston body, and in which two opposite thickness surfaces are respectively connected with the inner wall of piston body and the outer wall of the inserting tube. The inserting plates are mainly used to fix the inserting tube, and the number and arrangement of the inserting plates are not limited. For example, three inserting plates are evenly arranged around the circumference of the inserting tube, or more or fewer inserting plates are evenly arranged or non-evenly arranged around the circumference of the inserting tube.

The electric pump-type packaging tube for toothpaste as described above, in which the pushing rod, which is the straight rod, is provided on the same line with the inserting tube, and the diameter of the pushing rod is less than the inner diameter of the inserting tube. The diameter of the pushing rod is less than an inner diameter of the inserting tube, which is the case when both the pushing rod and the inserting tube are the cylindrical structure by default. When they are non-cylindrical structure, their dimensional relationship needs to ensure that the pushing rod can be inserted into the inserting tube. In the initial state (i.e. before the linear actuator mechanism starts working), the pushing rod can be inserted into the inserting tube or not. In the initial state, when the pushing rod is inserted into the inserting tube, the pushing rod further moves towards the inserting tube under the driving action of the driving device. In the initial state, when the pushing rod is not inserted into the inserting tube, the pushing rod moves along the straight line under the driving action of the driving device, and will be inserted into the inserting tube and connected with the piston, so as to drive the piston to move towards the nozzle segment. The pushing rod may not necessarily be the straight rod, it can also be a scissors-fork hoisting mechanism formed by a combination of multiple straight rods, or rods with irregular shape, etc.

The electric pump-type packaging tube for toothpaste as described above, in which the baffle is provided at or near the first end of the tail segment, and the rod passing through hole for the pushing rod to pass through is provided on the baffle. Before operation, the pushing rod of the linear actuator mechanism can be located below the rod passing through hole. That is, during the operation of the linear actuator mechanism, the pushing rod contacts with the piston after passing through the rod passing through hole, or pass through the rod passing through hole. At this time, it can play a better guiding role and prevent the pushing rod from deviating from the inserting tube of the piston during the operation of the linear actuator mechanism.

The electric pump-type packaging tube for toothpaste as described above, in which the connection part between the baffle and the first end of the tail segment is recessed towards the second end of the tail segment to form a groove, and the inner tube is inserted into the groove.

The electric pump-type packaging tube for toothpaste as described above, in which the structure of the control device is the same as that of the integral push-rod type packaging tube.

The electric pump-type packaging tube for toothpaste as described above, in which the electric source or the battery is connected with the charging circuit. The control unit is provided at the tail segment or the main body segment, or also can be provided at the nozzle segment. Because the nozzle segment is detachably connected with the main body segment, when the control unit is provided at the nozzle segment, the special conductive materials need to be respectively provided at the nozzle segment, the main body segment and the tail segment, so that when the main body segment and the nozzle segment are connected with the tail segment, the conductive materials are conducted, and the control unit is respectively connected with the power supply unit and the driving device.

The electric pump-type packaging tube for toothpaste as described above, in which the connection structure between the nozzle segment and the main body segment is that the outer tube extends from the opening at the first end of the nozzle segment to the second end of the nozzle segment to form a connection tube, which is detachably connected with the first end of the inner tube.

The electric pump-type packaging tube for toothpaste as described above, also includes the tube cover, the tube cap and the closing sheet. The tube cover includes the lower cover and the upper cover, and the lower cover is hollow tubular shape with both ends open, and the upper cover and the tube cap are hollow tubular shape with one end open and the other end closed. The upper cover is rotatably connected with the lower cover, which is detachably connected with the first end of the nozzle segment. The tube cap is detachably connected with the connection part between the nozzle segment and the main body segment, and the closing sheet is detachably connected with the second end of the tail segment.

All detachable connections in the above can adopt threaded connections, or concave-convex matching connections or other connection structures.

Beneficial Effects (1) The electric pump-type packaging tube for toothpaste in the present application is suitable for paste daily chemical products such as toothpaste, face cream and etc. There is no need to squeeze by hand during use, and it is convenient and fast to squeeze the internal filler out.

(2) The electric pump-type packaging tube for toothpaste in the present application can effectively avoid the waste of the internal filler caused by not-fully squeezing out.

(3) The electric pump-type packaging tube for toothpaste in the present application can be reused for many times.

DETAILED DESCRIPTION

The present application is described in further detail below in combination with specific embodiments. It should be understood that these embodiments are only used to illustrate the present application and not used to limit the protection scope of the present application. Additionally, it should be understood that after reading contents taught in the present application, those skilled in the art can make various changes or modifications to present application, and all equivalent forms also should be considered as falling within the scope limited by the claims appended in the present application.

Embodiment 1

Figure 1:
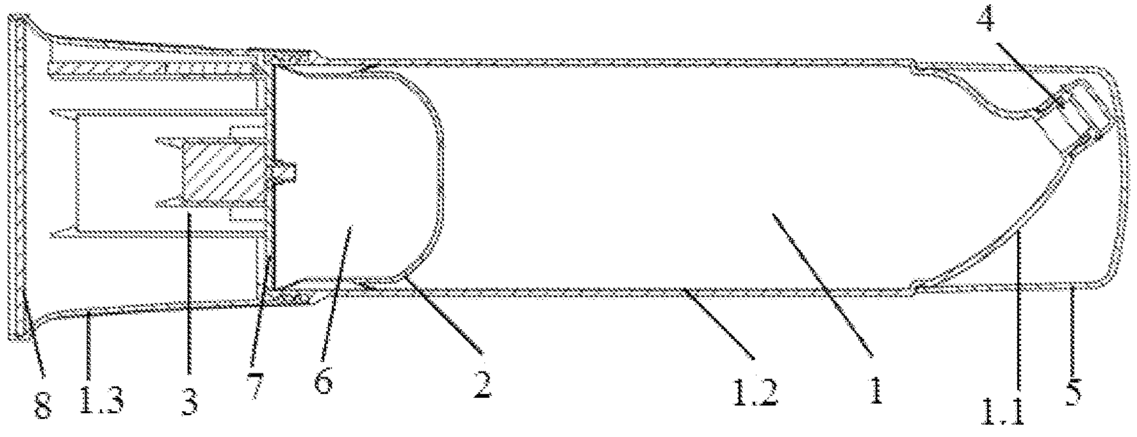
FIG. 1 is a structural diagram of the integral packaging tube in the present application.
Figure 2:
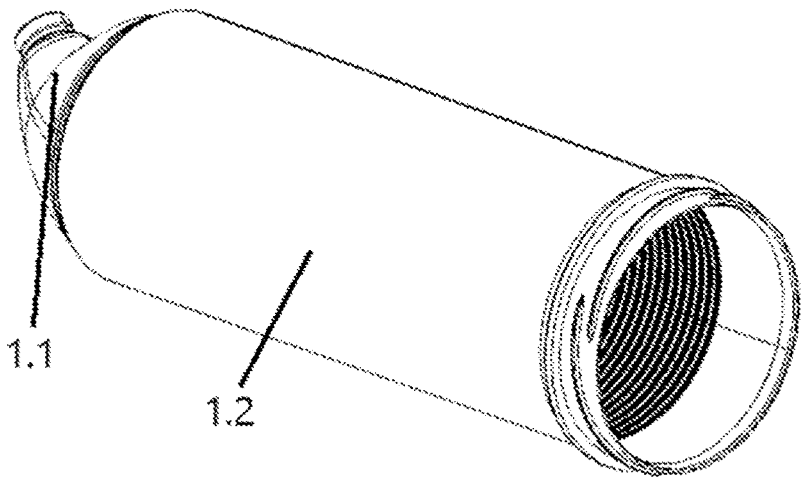
FIG. 2 is the structural diagram of connection structure between the nozzle segment and the main body segment of the integral packaging tube and the integral push-rod type packaging tube in the present application.
Figure 3:
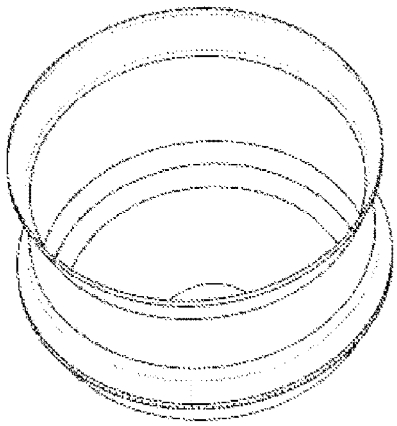
FIG. 3 is the structural diagram of the piston of the integral packaging tube and the two-segment packaging tube in the present application.
Figure 4:
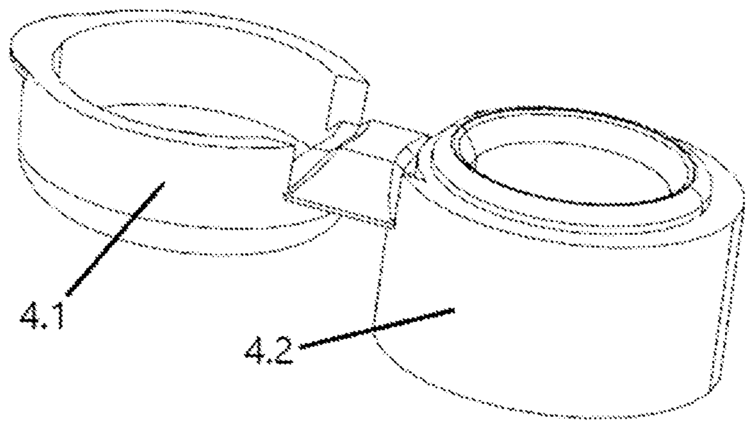
FIG. 4 is the structural diagram of the tube cover of the integral packaging tube, the two-segment packaging tube, the integral push-rod type packaging tube and the three-segment push-rod type packaging tube in the present application.

An integral packaging tube, as shown in FIG. 1, mainly including a tube body 1, a piston 2, a piston electric driving device 3, a tube cover 4 and a tube cap 5. The tube body 1 includes a nozzle segment 1.1, a main body segment 1.2 and a tail segment 1.3. A first end of the nozzle segment 1.1 is provided with an opening, and a second end of the nozzle segment 1.1 is connected with the first end of the main body segment 1.2. As shown in FIG. 2, the nozzle segment 1.1 and the main body segment 1.2 are formed integrally, the second end of the main body segment 1.2 is detachably connected with the first end of the tail segment 1.3. The structure of the piston 2 is as shown in FIG. 3, and the piston 2 is provided in the main body segment 1.2, and they are in an interference fit. The piston electric driving device 3 is connected with the tail segment 1.3, which is used for driving the piston 2 to move a certain distance towards the nozzle segment 1.1 and then stop moving. As shown in FIG. 4, the tube cover 4 includes a lower cover 4.2 and a upper cover 4.1, and the lower cover 4.2 is hollow tubular shape with both ends open, and the upper cover 4.1 and the tube cap 5 are hollow tubular shape with one end open and the other end closed. The upper cover 4.1 is rotatably connected with the lower cover 4.2, which is detachably connected with the first end of the nozzle segment 1.1, and the tube cap 5 is detachably connected with a connection part between the nozzle segment 1.1 and the main body segment 1.2.

Figure 7:
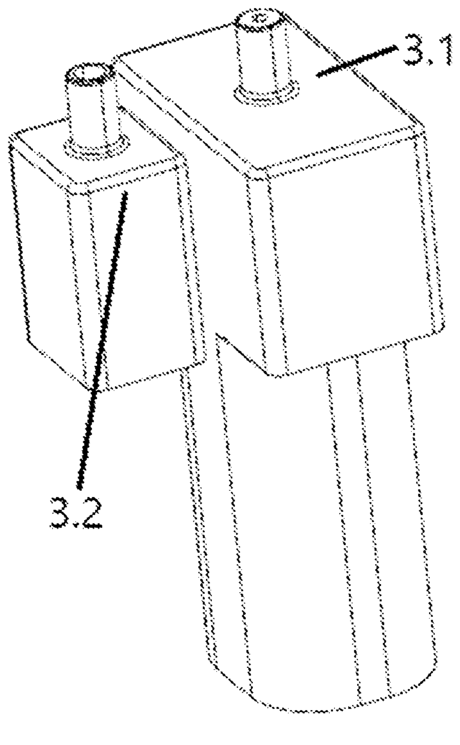
FIG. 7 is the partial structural diagram of the piston electric driving device of the integral packaging tube and the two-segment packaging tube in the present application.

A surface of the piston 2 facing away from the nozzle segment 1.1 forms a part of a wall surface of an airtight chamber. As shown in FIG. 7, the piston electric driving device 3 includes a pressurization device 3.1, a pressure relief device 3.2 and a control device. The pressurization device 3.1 is used for increasing pressure in the airtight chamber 6, and the pressure relief device 3.2 is used for releasing the pressure in the airtight chamber 6, and the control device is used for controlling the opening and closing of the pressurization device 3.1 and the pressure relief device 3.2. When the control device is in a first working state, the pressure relief device 3.2 is closed and the pressurization device 3.1 is opened. When the control device is in a second working state, the pressure relief device 3.2 is opened and the pressurization device 3.1 is closed.

Figure 5:
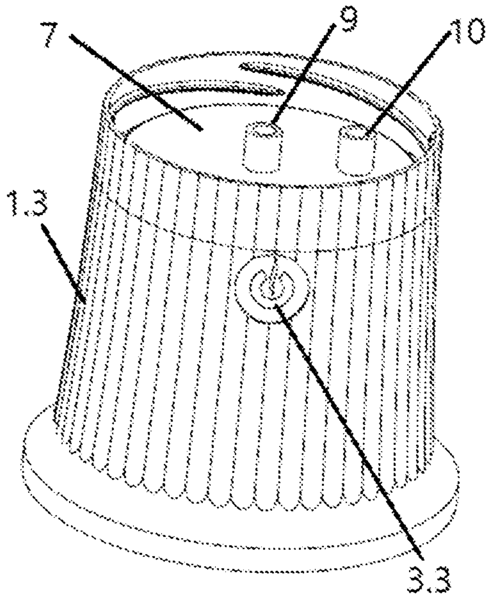
FIGS. 5-6 are the structural diagrams of the tail segment of the integral packaging tube in the present application.
Figure 6:
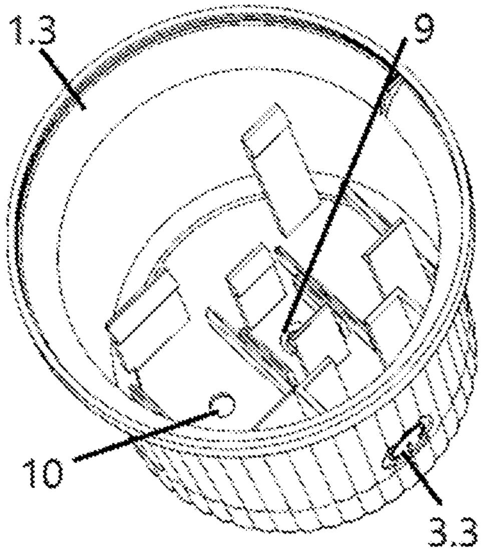

As shown in FIGS. 5-6, a baffle 7 is provided at or near the first end of the tail segment 1.3, and the baffle 7, the piston 2 and the tube body 1 enclose the airtight chamber 6.

The piston electric driving device 3 is provided in the tail segment 1.3.

The pressurization device 3.1 is a booster pump, which is a gas booster pump or a liquid booster pump, and the pressure relief device 3.2 is a pressure relief valve.

The baffle 7 is provided with a drain inlet 9 and a drain outlet 10. The second end of the tail segment 1.3 is an opening end, or a closing end provided with a through hole, or the second end of the tail segment 1.3 is the closing end which is closed by a closing sheet 8, and a tube wall of the tail segment 1.3 is provided with the through hole at the same time. An outlet of the booster pump is communicated with the drain inlet 9, and the pressure relief valve is used for the opening and closing of the drain outlet 10.

The control device mainly includes a power supply unit and a control unit, which are connected with each other. The power supply unit is an electric source or a battery, and the control unit is connected with the pressurization device 3.1 and the pressure relief device 3.2. The control unit is used for controlling a connection state of the power supply unit with the pressurization device 3.1 and the pressure relief device 3.2, and the connection state is connected or disconnected.

The control unit includes an induction disk 3.3, an integrated circuit IC2 and a field effect transistor Q1. When the induction disk 3.3 receives induction, the integrated circuit IC2 and the field effect transistor Q1 are controlled to connect the power supply unit with the pressurization device 3.1 and the pressure relief device 3.2, so as to control to open the pressurization device 3.1 and close the pressure relief device 3.2. When the induction disk 3.3 does not receive the induction, the integrated circuit IC2 and the field effect transistor Q1 are controlled to disconnect the power supply unit with the pressurization device 3.1 and the pressure relief device 3.2, so as to control to close the pressurization device 3.1 and open the pressure relief device 3.2.

The electric source or the battery is connected with a charging circuit; the control unit is provided at the tail segment 1.3.

Figure 8:
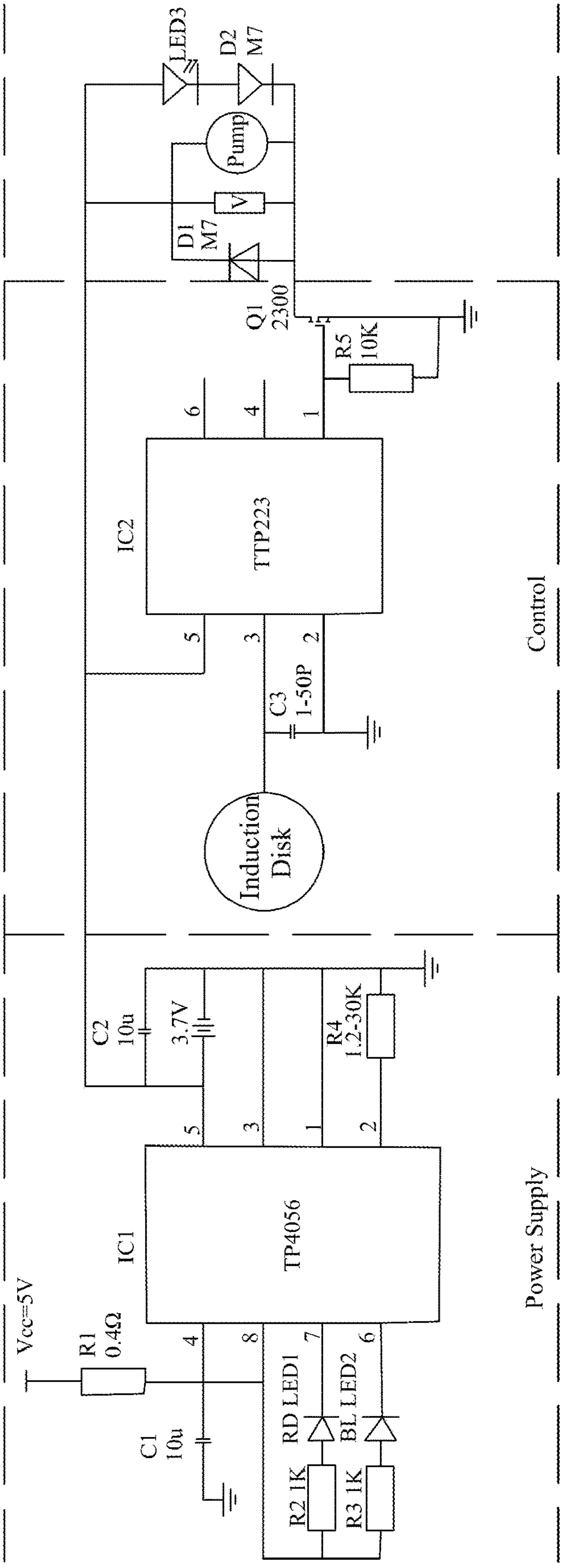
FIG. 8 is the structural diagram of the control device itself and its connection type with the booster pump and the pressure relief valve, as well as the elements in the charging circuit and their connection type of the integral packaging tube and the two-segment packaging tube in the present application.

Now, taking that the control unit includes the induction disk 3.3, the integrated circuit IC2 and field effect transistor Q1, and the pressurization device 3.1 and the pressure relief device 3.2 are the booster pump and the pressure relief valve respectively as an example, the control device itself, a connection type between it and the booster pump and the pressure relief valve, as well as each element in the charging circuit and their connection type are specifically illustrated, as shown in FIG. 8.

A first pin of the integrated circuit IC2 is connected with a bias resistance R5 and the field effect transistor Q1 at the same time, and the bias resistance R5 and the field effect transistor Q1 are connected with the ground. The field effect transistor Q1 is connected with a positive pole of a freewheeling diode D1, the pressure relief valve, the booster pump and a negative pole of a work indicating step-down diode D2 at the same time, and the positive pole of the work indicating step-down diode D2 is connected with the negative pole of a work indicating diode LED3. The negative pole of the freewheeling diode D1, the pressure relief valve, the booster pump and the positive pole of the work indicating diode LED3 are connected with a fifth pin of the integrated circuit IC2 at the same time, which is connected with the electric source (battery). A third pin of the integrated circuit IC2 is connected with the induction disk, and a second pin of the integrated circuit IC2 is connected with a sensitivity adjusting capacitance C3, which is connected with the induction disk. When a finger presses the induction disk, the first pin of the integrated circuit IC2 outputs high electrical level to drive the booster pump to start increasing the pressure, and control the pressure relief valve to stop releasing pressure at the same time, and filler is pushed and discharged from the packaging tube at this time. When the finger leaves the induction disk, the first pin of the integrated circuit IC2 outputs low electrical level to drive the booster pump to stop increasing the pressure, and control the pressure relief valve to start releasing pressure at the same time, and the filler stops being discharged from the packaging tube at this time.

The first pin and the third pin of an integrated circuit IC1 is connected with the ground. The second pin of the integrated circuit IC1 is connected with a resistance R4, which is connected with the ground. The fifth pin of the integrated circuit IC1 is connected with the positive pole of the electric source (battery), a filter capacitor C2 and the fifth pin of the integrated circuit IC2, and the negative pole of the electric source (battery) is connected with the filter capacitor C2. A fourth pin of the integrated circuit IC1 is connected with a filter capacitor C1, which is connected with the ground. A sixth pin and a seventh pin of the integrated circuit IC1 are respectively connected with the negative pole of a work indicating diode LED2 and a work indicating diode LED1. The positive pole of the work indicating diode LED1 and the work indicating diode LED2 are respectively connected with a resistance R2 and a resistance R3. The resistance R2 and the resistance R3 are connected with a eighth pin of the integrated circuit IC1, which is connected with the resistance R1. The resistance R1 is connected with a USB charging interface.

Embodiment 2

Figure 9:
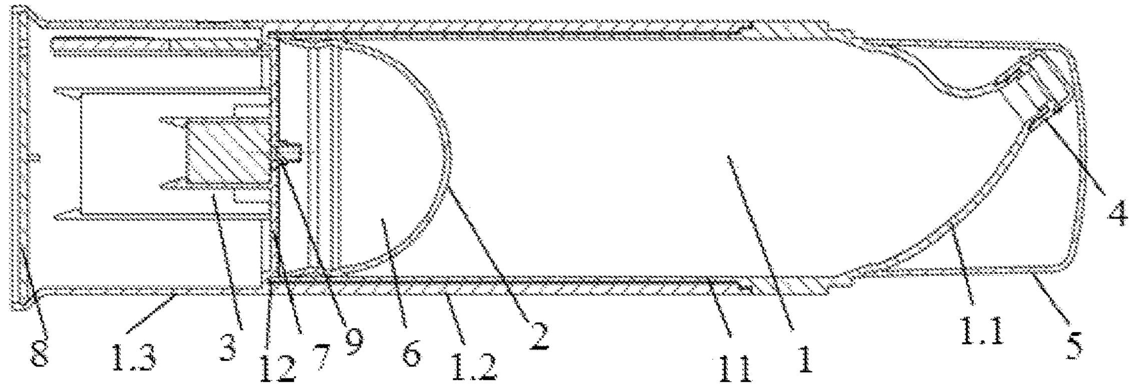
FIGS. 9-10 are the structural diagrams of the two-segment packaging tube in the present application.
Figure 10:
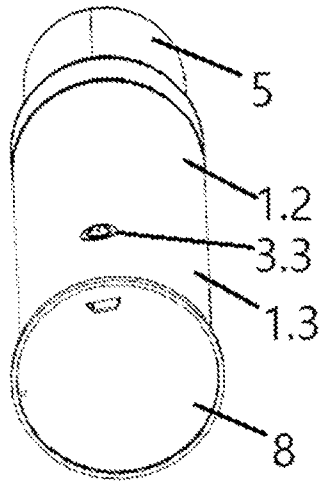
Figure 11:
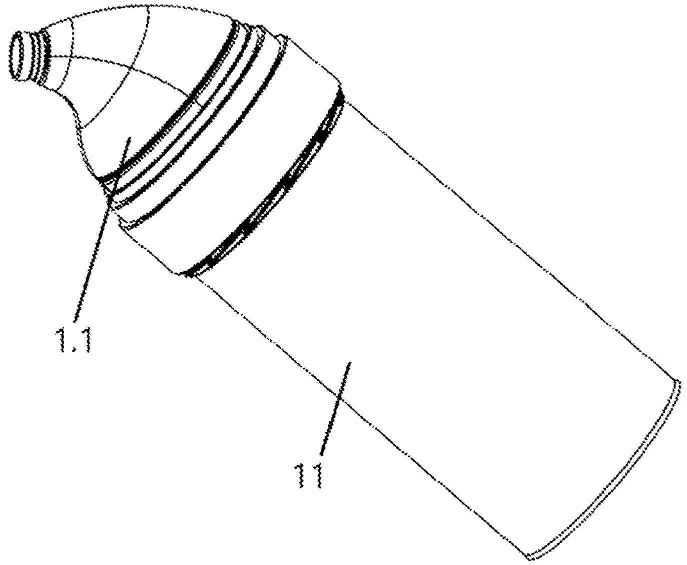
FIG. 11 is the structural diagram of the connection structure between the nozzle segment and the extension tube segment of the two-segment packaging tube in the present application.

A two-segment packaging tube, as shown in FIGS. 9-11, mainly includes the tube body 1, the piston 2, the piston electric driving device 3, the tube cover 4 and the tube cap 5. The tube body 1 includes the nozzle segment 1.1, the main body segment 1.2 and the tail segment 1.3. The first end of the nozzle segment 1.1 is provided with the opening, and the second end of the nozzle segment 1.1 is connected with the first end of the main body segment 1.2. The nozzle segment is detachably connected with the main body segment, and an inner wall of the nozzle segment extends from the second end of the nozzle segment to the second end of the main body segment to form an extension tube 11 provided in the main body segment. The main body segment and the tail segment are formed integrally. The structure of the piston 2 is as shown in FIG. 3, and the piston 2 is provided in the extension tube 11, and the piston 2 and the extension tube 11 form an interference fit. The piston electric driving device 3 is connected with the tail segment 1.3, which is used for driving the piston 2 to move a certain distance towards the nozzle segment 1.1 and then stop moving. As shown in FIG. 4, the tube cover 4 includes the lower cover 4.2 and the upper cover 4.1, and the lower cover 4.2 is hollow tubular shape with both ends open, and the upper cover 4.1 and the tube cap 5 are hollow tubular shape with one end open and the other end closed. The upper cover 4.1 is rotatably connected with the lower cover 4.2, which is detachably connected with the first end of the nozzle segment 1.1, and the tube cap 5 is detachably connected with the connection part between the nozzle segment 1.1 and the main body segment 1.2.

The surface of the piston 2 facing away from the nozzle segment 1.1 forms a part of the wall surface of the airtight chamber 6. As shown in FIG. 7, the piston electric driving device 3 includes the pressurization device 3.1, the pressure relief device 3.2 and the control device. The pressurization device 3.1 is used for increasing the pressure in the airtight chamber 6, and the pressure relief device 3.2 is used for releasing the pressure in the airtight chamber 6, and the control device is used for controlling the opening and closing of the pressurization device 3.1 and the pressure relief device 3.2. When the control device is in the first working state, the pressure relief device 3.2 is closed and the pressurization device 3.1 is opened. When the control device is in the second working state, the pressure relief device 3.2 is opened and the pressurization device 3.1 is closed.

Figure 12:
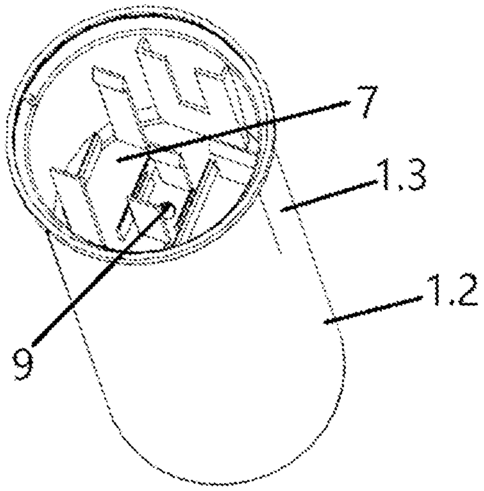
FIGS. 12-13 are the structural diagrams of the connection structure between the main body segment and the tail segment of the two-segment packaging tube in the present application.
Figure 13:
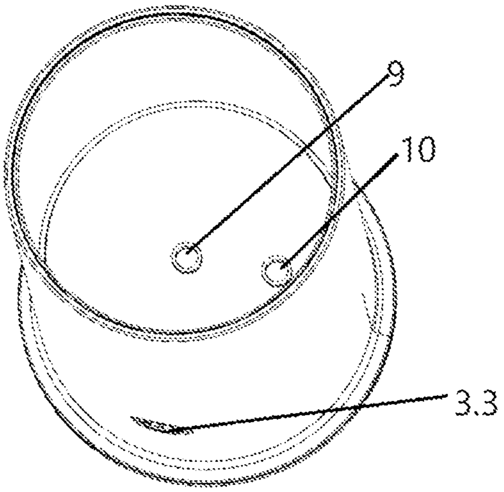

As shown in FIGS. 12-13, the baffle 7 is provided at or near the first end of the tail segment 1.3, a connection part between the tail segment and the baffle is recessed towards a second end of the tail segment to form a groove 12, and the extension tube 11 is inserted into the groove 12; and the baffle 7, the piston 2 and the tube body 1 enclose the airtight chamber 6.

The piston electric driving device 3 is provided in the tail segment 1.3.

The pressurization device 3.1 is the booster pump, which is the gas booster pump or the liquid booster pump, and the pressure relief device 3.2 is the pressure relief valve.

The baffle 7 is provided with the drain inlet 9 and the drain outlet 10. The second end of the tail segment 1.3 is the opening end, or the closing end provided with the through hole, or the second end of the tail segment 1.3 is the closing end which is closed by the closing sheet 8, and the tube wall of the tail segment 1.3 is provided with the through hole at the same time. An outlet of the booster pump is communicated with the drain inlet 9, and the pressure relief valve is used for the opening and closing of the drain outlet 10.

The control device is the same as or has some differences from that in the embodiment 1. For example, the difference is that the control unit is a mechanical switch, an infrared switch or a microwave switch. When the switch is turned on, the control unit connects the power supply unit with the pressurization device 3.1 and the pressure relief device 3.2, so as to control to open the pressurization device 3.1 and close the pressure relief device 3.2. When the switch is turned off, the control unit disconnects the power supply unit with the pressurization device 3.1 and the pressure relief device 3.2, so as to control to close the pressurization device 3.1 and open the pressure relief device 3.2. The control unit is provided at the tail segment 1.3 or the main body segment 1.2.

When the control unit includes the induction disk 3.3, the integrated circuit IC2 and the field effect transistor Q1, and the pressurization device 3.1 and the pressure relief device 3.2 are the booster pump and the pressure relief valve respectively, the control device itself, the connection type between it and the booster pump and the pressure relief valve, as well as each element in the charging circuit and their connection type are the same with the embodiment 1, as shown in FIG. 8.

Figure 14:
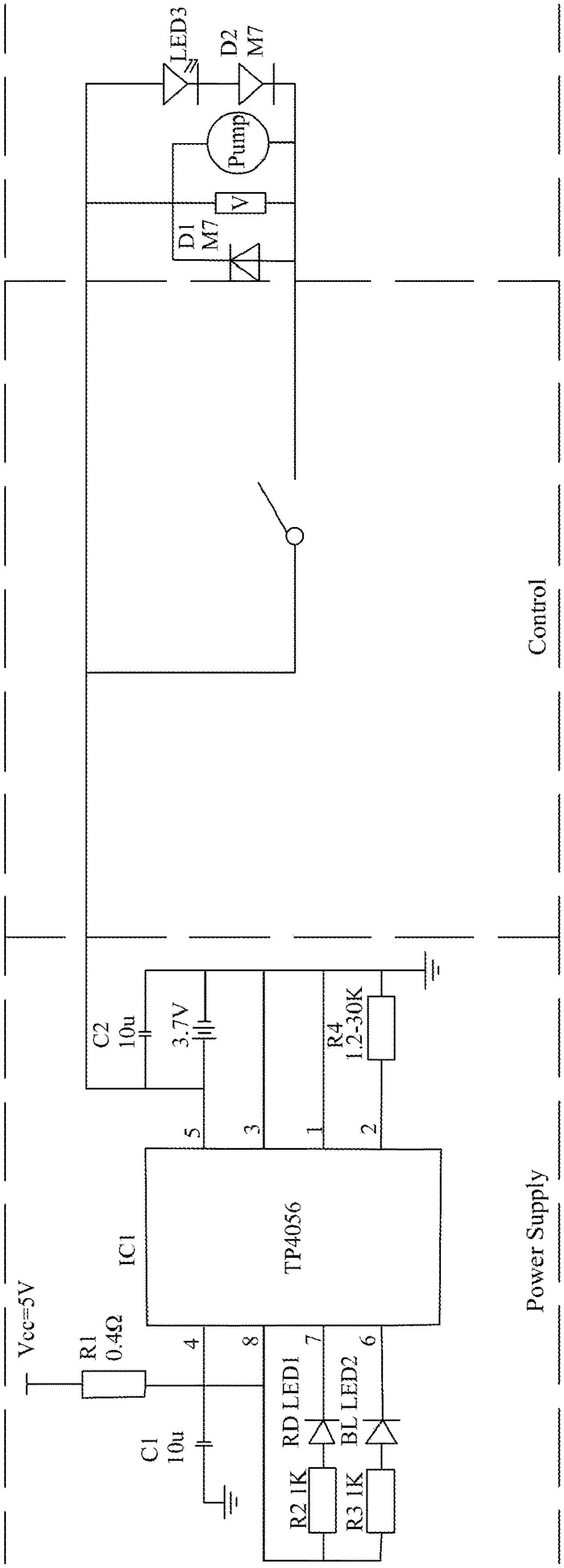
FIGS. 14-15 are the structural diagrams of the control device itself and its connection type with the booster pump and the pressure relief valve, as well as the elements in the charging circuit and their connection type of the two-segment packaging tube in the present application.

When the control unit is the mechanical switch, the control device itself, the connection type between it and the booster pump and the pressure relief valve, as well as each element in the charging circuit and their connection type are as shown in FIG. 14.

Figure 15:
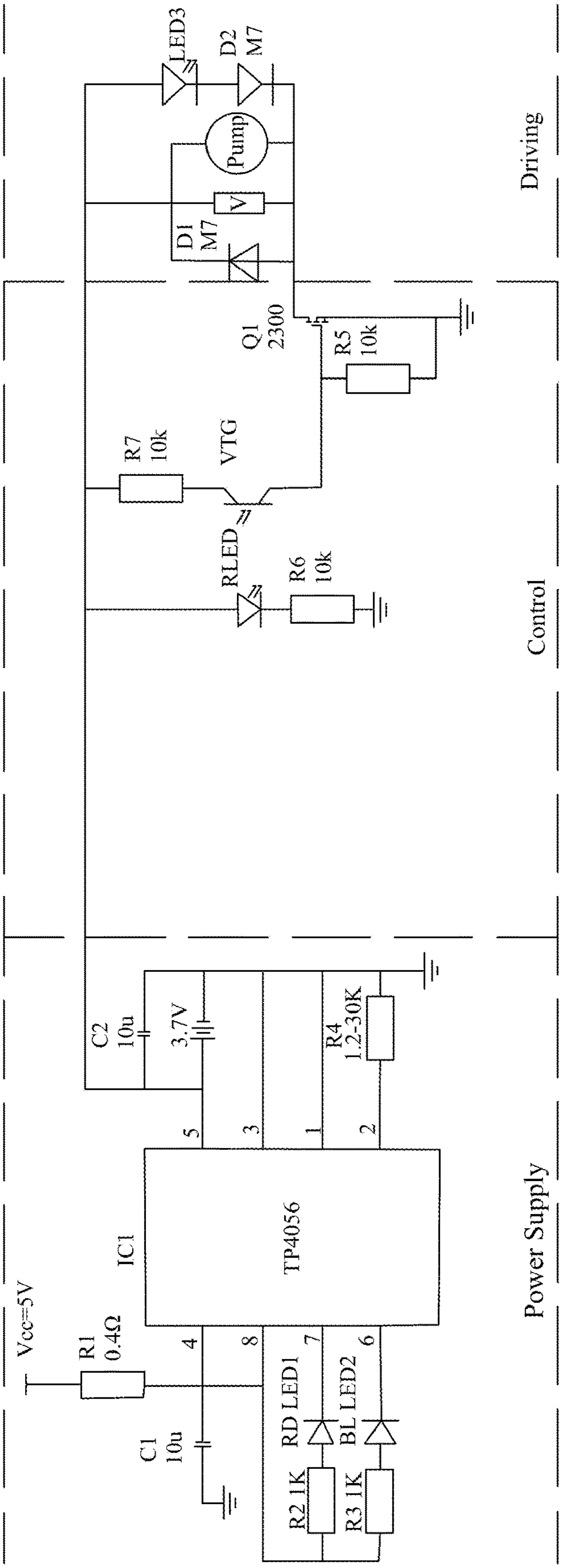

When the control unit is the infrared switch, the control device itself, the connection type between it and the booster pump and the pressure relief valve, as well as each element in the charging circuit and their connection type are as shown in FIG. 15. The infrared switch includes an infrared emitting part and an infrared receiving part, and the infrared emitting part includes an infrared emitting tube RLED and a bias resistance R6, and the infrared receiving part includes an infrared receiving tube VTG, a bias resistance R7, the bias resistance R5 and the field effect transistor Q1. Working principle is that the infrared emitting tube RLED emits infrared light when working, an object forms a reflecting surface in front of the infrared emitting tube RLED and the infrared receiving tube VTG, the infrared light is reflected to the infrared receiving tube VTG to conduct it and trigger conduction of the field effect transistor Q1. When there is no object in front of the infrared emitting tube RLED and the infrared receiving tube VTG, the infrared receiving tube VTG cannot receive the infrared light, so as to cut off the Field Effect Transistor Q1 and stop working at the same time.

Embodiment 3

Figure 17:
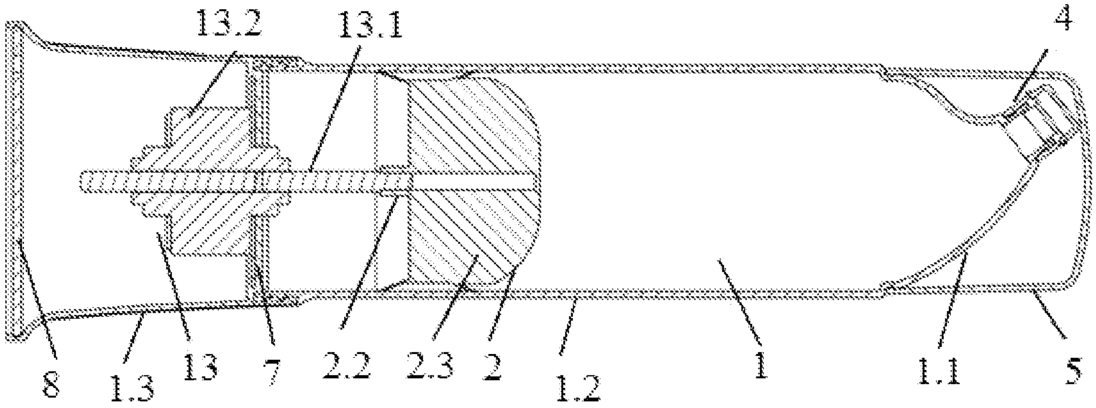
FIGS. 17-18 are the structural diagrams of the integral push-rod type packaging tube in the present application.
Figure 18:
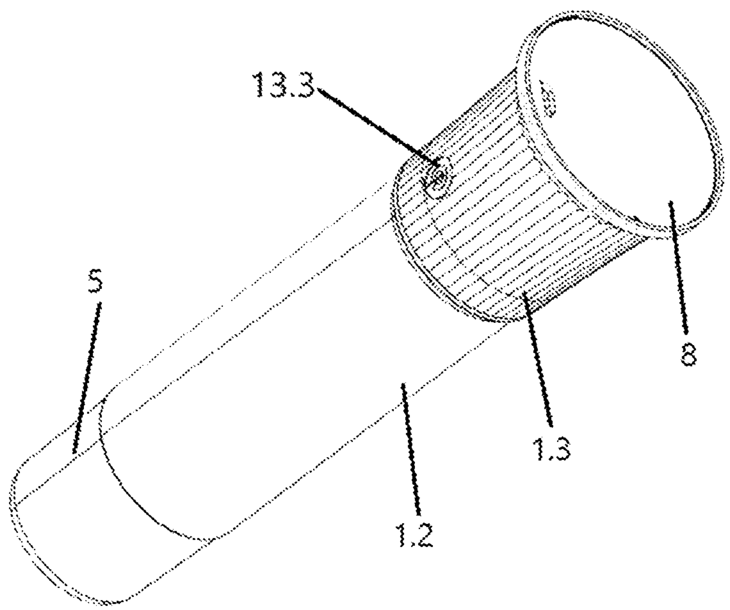

An integral push-rod type packaging tube, as shown in FIG. 2 and FIGS. 17-18, includes the tube body 1, the piston 2, a linear actuator mechanism 13, the tube cover 4, the tube cap 5 and the closing sheet 8.

The tube body 1 includes the nozzle segment 1.1, the main body segment 1.2 and the tail segment 1.3. The first end of the nozzle segment 1.1 is provided with the opening, and the second end of the nozzle segment 1.1 is connected with the first end of the main body segment 1.2, and the second end of the main body segment 1.2 is detachably connected with the first end of the tail segment 1.3. The nozzle segment 1.1 and the main body segment 1.2 are formed integrally.

Figure 16:
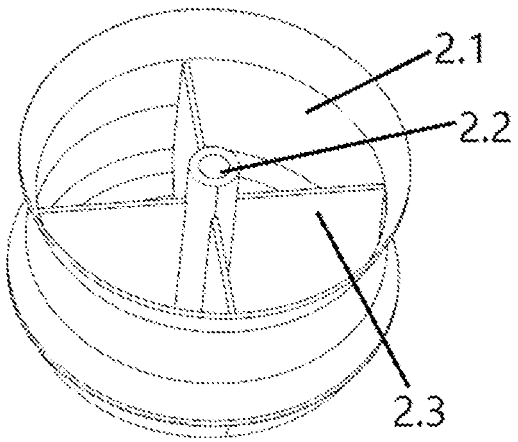
FIG. 16 is the structural diagram of the piston of the integral push-rod type packaging tube and the three-segment push-rod type packaging tube in the present application.

The piston 2 is provided in the main body segment 1.2, and the piston 2 and the main body segment 1.2 form an interference fit. As shown in FIG. 16, the piston 2 includes a piston body 2.1, an inserting tube 2.2 and multiple inserting plates 2.3. The piston body 2.1 is cylindrical structure with one end closed and the other end open, and the closing end and the opening end of the piston body 2.1 are respectively close to the first end and the second end of the main body segment 1.2. The inserting tube 2.2 is inserted in the piston body 2.1, and is connected with the closing end of the piston body 2.1. The inserting plates 2.3 are inserted in the piston body 2.1, and in which two opposite thickness surfaces are respectively connected with the inner wall of piston body 2.1 and an outer wall of the inserting tube 2.2.

Figure 20:
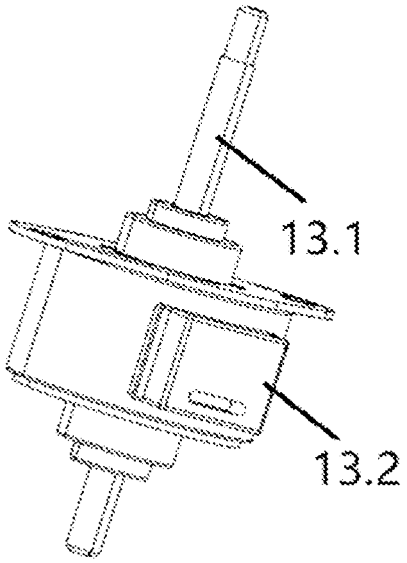
FIG. 20 is the partial structural diagram of the linear actuator mechanism of the integral push-rod type packaging tube and the three-segment push-rod type packaging tube in the present application.

As shown in FIG. 20, the linear actuator mechanism 13, which is fixed in the tail segment 1.3 and includes a pushing rod 13.1, is used for driving the piston 2 to move a certain distance towards the nozzle segment 1.1 and then stop moving. The linear actuator mechanism 13 mainly includes a control device 13.3, a driving device 13.2 and the pushing rod 13.1. The control device 13.3 is used for controlling the opening and closing of the driving device 13.2, and the driving device 13.2 is used to drive the pushing rod 13.1 to move along a straight line.

The pushing rod 13.1, which is a straight rod, is provided on the same line with the inserting tube 2.2, and a diameter of the pushing rod 13.1 is less than an inner diameter of the inserting tube 2.2.

Figure 19:
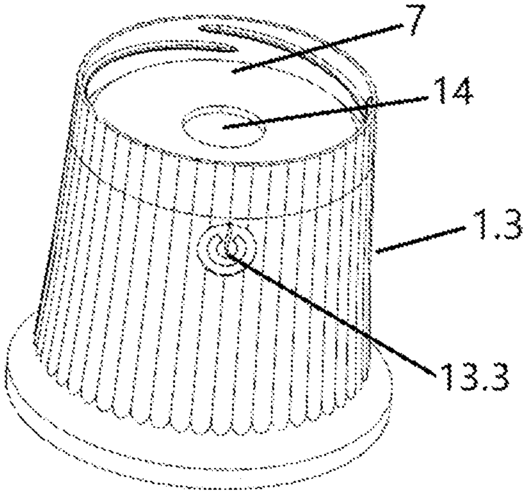
FIG. 19 is the structural diagram of the tail segment of the integral push-rod type packaging tube in the present application.

As shown in FIG. 19, the baffle 7 is provided at or near the first end of the tail segment 1.3, and a rod passing through hole 14 for the pushing rod 13.1 to pass through is provided on the baffle 7.

The control device mainly includes a power supply unit and a control unit, which are connected with each other. The power supply unit is an electric source or a battery, and the control unit is connected with the driving device 13.2. The control unit is used for controlling the connection state of the power supply unit with the driving device 13.2, and the connection state is connected or disconnected.

The control unit includes the induction disk, the integrated circuit IC2 and the field effect transistor Q1. When the induction disk receives the induction, the integrated circuit IC2 and the field effect transistor Q1 are controlled to connect the power supply unit with the driving device 13.2, so as to control to open the driving device 13.2, and the pushing rod 13.1 moves along the straight line. When the induction disk does not receive the induction, the integrated circuit IC2 and the field effect transistor Q1 are controlled to disconnect the power supply unit with the driving device 13.2, so as to control to close the driving device 13.2, and the pushing rod 13.1 stops moving.

The electric source or the battery is connected with the charging circuit; the control unit is provided at the tail segment 1.3.

Figure 21:
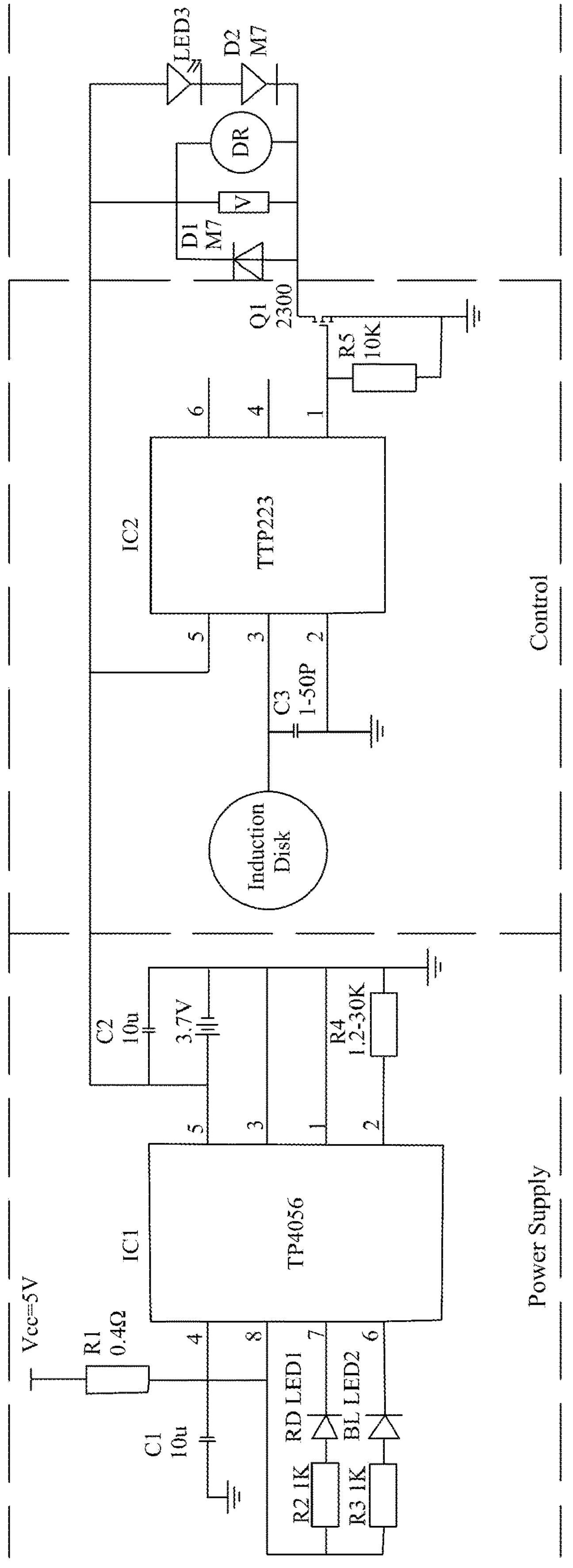
FIG. 21 is the structural diagram of the control device itself and its connection type with the booster pump and the pressure relief valve, as well as the elements in the charging circuit and their connection type of the integral push-rod type packaging tube and the three-segment push-rod type packaging tube in the present application.
Figure 22:
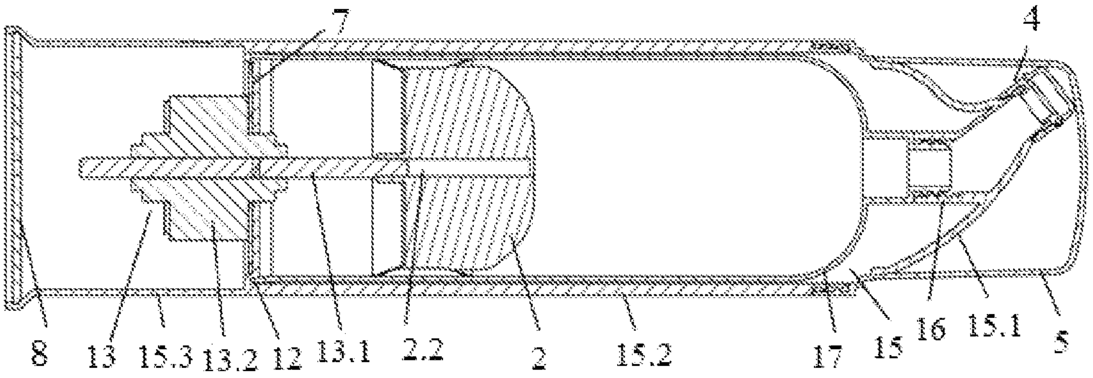
FIGS. 22-23 are the structural diagrams of the three-segment push-rod type packaging tube in the present application.
Figure 23:
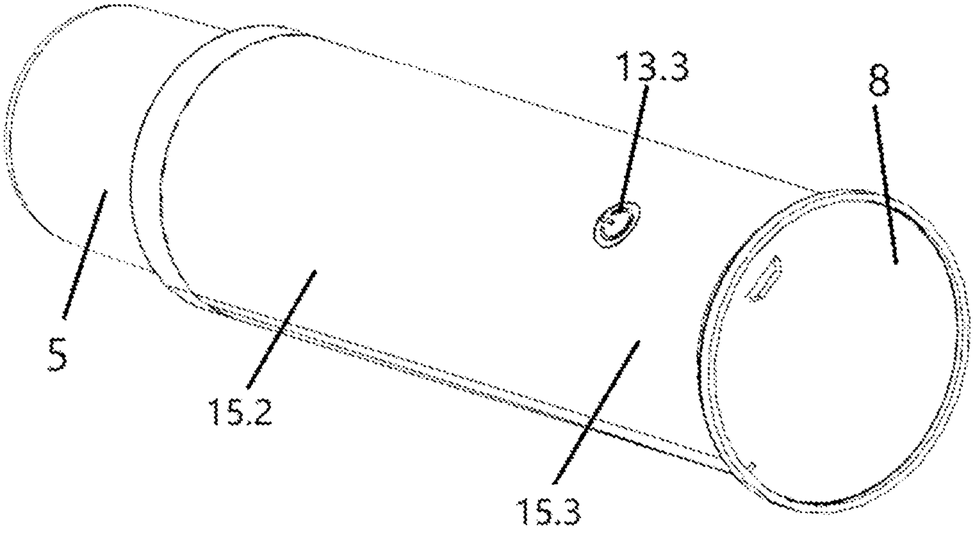
Figure 24:
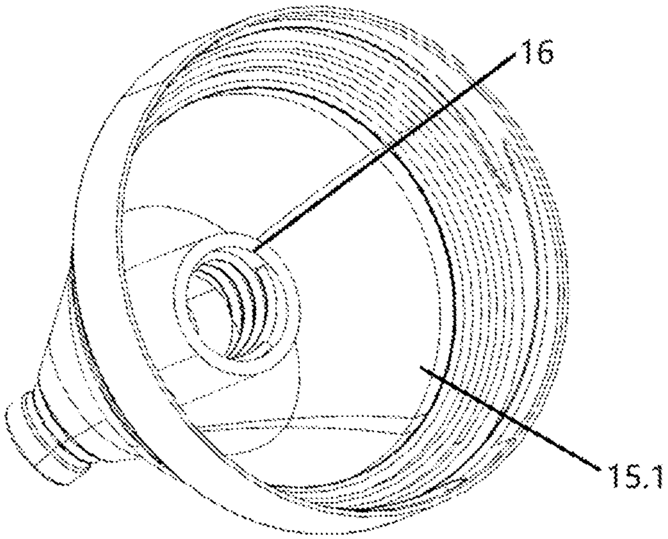
FIG. 24 is the structural diagram of the nozzle segment of the three-segment push-rod type packaging tube in the present application.
Figure 25:
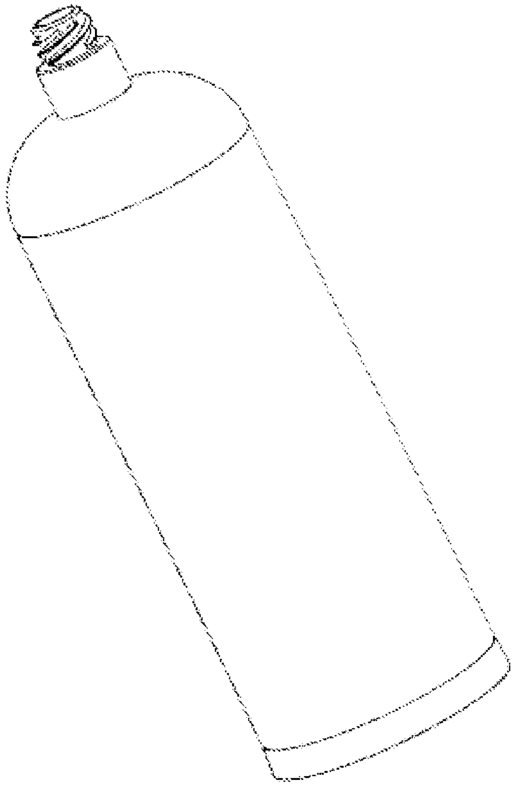
FIG. 25 is the structural diagram of the inner tube of the three-segment push-rod type packaging tube in the present application.

The control device 13.3 itself, the connection type between it and the driving device 13.2, as well as each element in the charging circuit and their connection type are as shown in FIG. 21.

The first pin of the integrated circuit IC2 is connected with a bias resistance R5 and the field effect transistor Q1 at the same time, and the bias resistance R5 and the field effect transistor Q1 are connected with the ground. The field effect transistor Q1 is connected with the positive pole of a freewheeling diode D1, the driving device 13.2 and the negative pole of a work indicating step-down diode D2 at the same time, and the positive pole of the work indicating step-down diode D2 is connected with the negative pole of a work indicating diode LED3. The negative pole of the freewheeling diode D1, the driving device 13.2 and the positive pole of the work indicating diode LED3 are connected with the fifth pin of the integrated circuit IC2 at the same time, which is connected with the electric source (battery). The third pin of the integrated circuit IC2 is connected with the induction disk, and the second pin of the integrated circuit IC2 is connected with the sensitivity adjusting capacitance C3, which is connected with the induction disk. When the finger presses the induction disk, the first pin of the integrated circuit IC2 outputs high electrical level to drive the driving device 13.2 to start working, and the pushing rod 13.1 moves at this time, so that the filler is pushed and discharged from the packaging tube. When the finger leaves the induction disk, the first pin of the integrated circuit IC2 outputs low electrical level to drive the driving device 13.2 to stop working, and the pushing rod 13.1 stops moving at this time, so that the filler stops being discharged from the packaging tube.

The first pin and the third pin of the integrated circuit IC1 is connected with the ground. The second pin of the integrated circuit IC1 is connected with a resistance R4, which is connected with the ground. The fifth pin of the integrated circuit IC1 is connected with the positive pole of the electric source (battery), the filter capacitor C2 and the fifth pin of the integrated circuit IC2, and the negative pole of the electric source (battery) is connected with the filter capacitor C2. The fourth pin of the integrated circuit IC1 is connected with a filter capacitor C1, which is connected with the ground. The sixth pin and a seventh pin of the integrated circuit IC1 are respectively connected with the negative pole of a work indicating diode LED2 and a work indicating diode LED1. The positive pole of the work indicating diode LED1 and the work indicating diode LED2 are respectively connected with the resistance R2 and a resistance R3. The resistance R2 and the resistance R3 are connected with the eighth pin of the integrated circuit IC1, which is connected with the resistance R1. The resistance R1 is connected with the USB charging interface.

As shown in FIG. 4, the tube cover 4 includes the lower cover 4.2 and the upper cover 4.1, and the lower cover 4.2 is hollow tubular shape with both ends open, and the upper cover 4.1 and the tube cap 5 are hollow tubular shape with one end open and the other end closed. The upper cover 4.1 is rotatably connected with the lower cover 4.2, which is detachably connected with the nozzle segment 1.1. The tube cap 5 is detachably connected with the connection part between the nozzle segment 1.1 and the main body segment 1.2, and the closing sheet 8 is detachably connected with the second end of the tail segment 1.3.

Embodiment 4

A three-segment push-rod type packaging tube, as shown in FIGS. 22-25, includes an outer tube 15, an inner tube 17, a piston 2, the linear actuator mechanism 13, the tube cover 4, the tube cap 5 and the closing sheet 8.

The outer tube 15 includes a nozzle segment 15.1, a main body segment 15.2 and a tail segment 15.3. The first end of the nozzle segment 15.1 is provided with the opening, and the second end of the nozzle segment 15.1 is detachably connected with the first end of the main body segment 15.2. The second end of the main body segment 15.2 is connected with the first end of the tail segment 15.3.

The inner tube 17 is provided in the nozzle segment 15.1 and the main body segment 15.2 of the outer tube 15. The piston 2 is provided in the inner tube 17, of which the second end is sealed by the piston 2, and the first end is detachably connected with the nozzle segment 15.1 of the outer tube 15. The specific connection structure is that the outer tube 15 extends from the opening of the first end of the nozzle segment 15.1 to the second end of the nozzle segment 15.1 to form a connection tube 16, which is detachably connected with the first end of the inner tube 17 and communicated with the opening at the first end of the nozzle segment 15.1.

As shown in FIG. 16, the piston 2 includes the piston body 2.1, the inserting tube 2.2 and multiple inserting plates 2.3. The piston body 2.1 is the cylindrical structure with one end closed and the other end open, and the closing end and the opening end of the piston body 2.1 are respectively close to the first end and the second end of the main body segment 15.2 of the outer tube 15. The inserting tube 2.2 is inserted in the piston body 2.1, and is connected with the closing end of the piston body 2.1. The inserting plates 2.3 are inserted in the piston body 2.1, and in which two opposite thickness surfaces are respectively connected with the inner wall of piston body 2.1 and the outer wall of the inserting tube 2.2.

As shown in FIG. 20, the linear actuator mechanism 13, which is fixed in the tail segment 15.3 of the outer tube 15 and includes the pushing rod 13.1, is used for driving the piston 2 to move a certain distance towards the nozzle segment 15.1 of the outer tube 15 and then stop moving by the pushing rod 13.1.

The linear actuator mechanism 13 mainly includes the control device 13.3, the driving device 13.2 and the pushing rod 13.1. The control device 13.3 is used for controlling the opening and closing of the driving device 13.2, and the driving device 13.2 is used to drive the pushing rod 13.1 to move along the straight line.

The pushing rod 13.1, which is the straight rod, is provided on the same line with the inserting tube 2.2, and the diameter of the pushing rod 13.1 is less than the inner diameter of the inserting tube 2.2.

Figure 26:
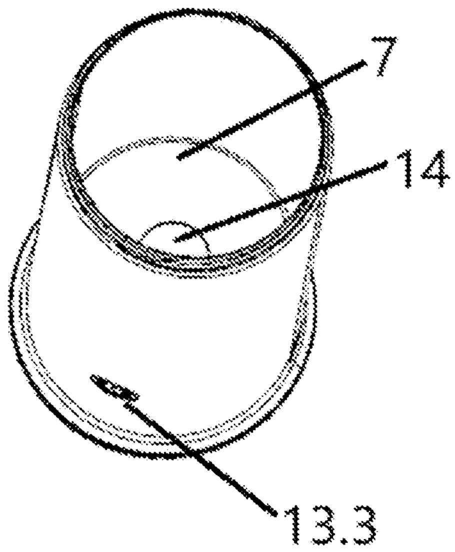
FIGS. 26-27 are the structural diagrams of the connection structure between the main body segment and the tail segment of the three-segment push-rod type packaging tube in the present application.
Figure 27:
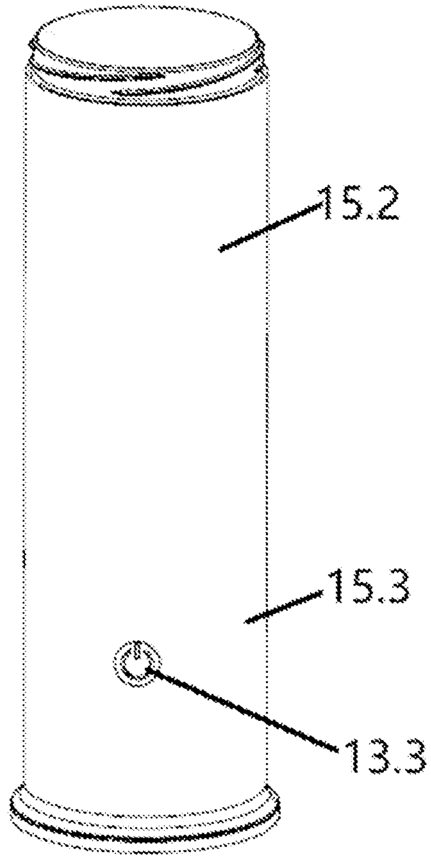

As shown in FIGS. 26-27, the baffle 7 is provided at the first end of the tail segment 15.3 of the outer tube 15, and the rod passing through hole 14 for the pushing rod 13.1 to pass through is provided on the baffle 7. The connection part between the baffle 7 and the first end of the tail segment 15.3 of the outer tube 15 is recessed towards the tail segment 15.3 of the outer tube 15 to form a groove 12, and the second end of the inner tube 17 is inserted into the groove 12.

The control device 13.3 is basically the same as that in the embodiment 3, and the difference is that the control unit is provided in the tail segment 15.3 or the main body segment 15.2 of the outer tube 15.

The control device 13.3 itself, the connection type between it and the driving device 13.2, as well as each element in the charging circuit and their connection type are as shown in FIG. 21, which is the same as the embodiment 3.

As shown in FIG. 4, the tube cover 4 includes the lower cover 4.2 and the upper cover 4.1, and the lower cover 4.2 is hollow tubular shape with both ends open, and the upper cover 4.1 and the tube cap 5 are hollow tubular shape with one end open and the other end closed. The upper cover 4.1 is rotatably connected with the lower cover 4.2, which is detachably connected with the first end of the nozzle segment 15.1. The tube cap 5 is detachably connected with the connection part between the nozzle segment 15.1 and the main body segment 15.2 of the outer tube 15, and the closing sheet 8 is detachably connected with the second end of the tail segment 1.3 of the outer tube 15.

What is claimed is:

1. An electric pump-type packaging tube for toothpaste, comprising a columnar storage cavity and a piston electric driving device provided therein, wherein one end of the storage cavity is a discharge port, and the other end is sealed by a piston, and the piston electric driving device is used for driving the piston to move a distance towards the discharge port and then stop moving, wherein, the electric pump-type packaging tube is an integral packaging tube and comprises a tube body; the tube body comprises a nozzle segment, a main body segment and a tail segment; a first end of the nozzle segment is provided with an opening, and a second end of the nozzle segment is connected with a first end of the main body segment, and a second end of the main body segment is connected with the first end of the tail segment; the nozzle segment and the main body segment are formed integrally; internal cavities of the nozzle segment and the main body segment together constitute the storage cavity, and an opening at the first end of the nozzle segment is the discharge port; the piston is provided in the main body segment, and the piston and the main body segment form an interference fit; the piston electric driving device is connected with the tail segment, and is used for driving the piston to move a distance towards the nozzle segment and then stop moving, wherein, a surface of the piston facing away from the nozzle segment forms a part of a wall surface of an airtight chamber; the piston electric comprises a pressurization device, a pressure relief device and a control device; the pressurization device is used for increasing pressure in the airtight chamber, and the pressure relief device is used for releasing the pressure in the airtight chamber, and the control device is used for controlling opening and closing of the pressurization device and the pressure relief device; when the control device is in a first working state, the pressure relief device is closed and the pressurization device is opened; when the control device is in a second working state, the pressure relief device is opened and the pressurization device is closed, and wherein, the control device mainly comprises a power supply unit and a control unit, which are connected with each other; the power supply unit is an electric source or a battery, and the control unit is connected with the pressurization device and the pressure relief device; the control unit is used for controlling a connection state of the power supply unit with the pressurization device and the pressure relief device, and the connection state is connected or disconnected;

the control unit comprises an induction disk, an integrated circuit (IC2) and a field effect transistor (Q1); when the induction disk receives induction, the integrated circuit (IC2) and the field effect transistor (Q1) are controlled to connect the power supply unit with the pressurization device and the pressure relief device, so as to control to open the pressurization device and close the pressure relief device; when the induction disk does not receive the induction, the integrated circuit (IC2) and the field effect transistor (Q1) are controlled to disconnect the power supply unit with the pressurization device and the pressure relief device, so as to control to close the pressurization device and open the pressure relief device.

2. The electric pump-type packaging tube for toothpaste according to claim 1, wherein, a baffle is provided at or near the first end of the tail segment, and the baffle, the piston and the tube body enclose the airtight chamber.

3. The electric pump-type packaging tube for toothpaste according to claim 2, wherein, the piston electric driving device is provided in the tail segment.

4. The electric pump-type packaging tube for toothpaste according to claim 3, wherein, the pressurization device is a booster pump, which is a gas booster pump or a liquid booster pump;

the pressure relief device is a pressure relief valve.

5. The electric pump-type packaging tube for toothpaste according to claim 4, wherein, the baffle is provided with a drain inlet and a drain outlet; a second end of the tail segment is an opening end, or a closing end provided with a through hole; or a second end of the tail segment is a closing end, and a tube wall of the tail segment is provided with a through hole at the same time;

an outlet of the booster pump is communicated with the drain inlet, and the pressure relief valve is used for controlling the opening and closing of the drain outlet.

6. The electric pump-type packaging tube for toothpaste according to claim 1, wherein, the electric source or the battery is connected with a charging circuit; the control unit is provided at the tail segment.

7. The electric pump-type packaging tube for toothpaste according to claim 1, wherein, the second end of the main body segment is detachably connected with the first end of the tail segment.

8. The electric pump-type packaging tube for toothpaste according to claim 1, further comprising a tube cover and a tube cap; the tube cover comprises a lower cover and an upper cover, and the lower cover is hollow tubular shape with both ends open, and the upper cover and the tube cap are hollow tubular shape with one end open and the other end closed; the upper cover is rotatably connected with the lower cover, which is detachably connected with the nozzle segment, and the tube cap is detachably connected with a connection part between the nozzle segment and the main body segment.

9. The electric pump-type packaging tube for toothpaste according to claim 1, wherein, a baffle is provided at or near the first end of the tail segment; a connection part between the tail segment and the baffle is recessed towards a second end of the tail segment to form a groove, and the extension tube is inserted into the groove; the baffle, the piston and the extension tube enclose the airtight chamber.

10. The electric pump-type packaging tube for toothpaste according to claim 9, wherein, the piston electric driving device is provided in the tail segment.

11. The electric pump-type packaging tube for toothpaste according to claim 10, wherein, the pressurization device is a booster pump, which is a gas booster pump or a liquid booster pump;

the pressure relief device is a pressure relief valve.

12. The electric pump-type packaging tube for toothpaste according to claim 11, wherein, the baffle is provided with a drain inlet and a drain outlet; the second end of the tail segment is an opening end, or a closing end provided with a through hole; or the second end of the tail segment is the closing end, and a tube wall of the tail segment is provided with the through hole at the same time; an outlet of the booster pump is communicated with the drain inlet, and the pressure relief valve is used for controlling the opening and closing of the drain outlet.

13. The electric pump-type packaging tube for toothpaste according to claim 1, wherein, the main body segment and the tail segment are formed integrally.

14. The electric pump-type packaging tube for toothpaste according to claim 1, further comprising a tube cover and a tube cap; the tube cover comprises a lower cover and an upper cover, and the lower cover is hollow tubular shape with both ends open, and the upper cover and the tube cap are hollow tubular shape with one end open and the other end closed; the upper cover is rotatably connected with the lower cover, which is detachably connected with the nozzle segment, and the tube cap is detachably connected with a connection part between the nozzle segment and the main body segment.

15. The pump-type packaging tube for toothpaste according to claim 1, wherein, the piston electric driving device is a linear actuator mechanism; the linear actuator mechanism is connected in the tail segment and comprises a pushing rod, which is used for driving the piston to move a distance towards the nozzle segment and then stop moving by the pushing rod.

16. The electric pump-type packaging tube for toothpaste according to claim 15, wherein, the second end of the main body segment is detachably connected with the first end of the tail segment.

17. The electric pump-type packaging tube for toothpaste according to claim 15, further comprising a tube cover, a tube cap and a closing sheet; the tube cover comprises a lower cover and an upper cover, and the lower cover is hollow tubular shape with both ends open, and the upper cover and the tube cap are hollow tubular shape with one end open and the other end closed; the upper cover is rotatably connected with the lower cover, which is detachably connected with the nozzle segment; the tube cap is detachably connected with a connection part between the nozzle segment and the main body segment, and the closing sheet is detachably connected with the second end of the tail segment.

18. The electric pump-type packaging tube for toothpaste according to claim 15, wherein, the linear actuator mechanism mainly comprises a control device, a driving device and the pushing rod; the control device is used for controlling the opening and closing of the driving device, and the driving device is used to drive the pushing rod to move along a straight line.

19. The electric pump-type packaging tube for toothpaste according to claim 18, wherein, the piston comprises a piston body, an inserting tube and multiple inserting plates; the piston body is cylindrical structure with one end closed and the other end open, and the closing end and the opening end of the piston body are respectively close to the first end and the second end of the main body segment; the inserting tube is inserted in the piston body, and is connected with the closing end of the piston body; the inserting plates are inserted in the piston body, and in which two opposite thickness surfaces are respectively connected with an inner wall of piston body and an outer wall of the inserting tube.

20. The electric pump-type packaging tube for toothpaste according to claim 19, wherein, the pushing rod, which is a straight rod, is provided on the same line with the inserting tube, and the diameter of the pushing rod is less than an inner diameter of the inserting tube.

21. The electric pump-type packaging tube for toothpaste according to claim 20, wherein, a baffle is provided at or near the first end of the tail segment, and a rod passing through hole for the pushing rod passing through is provided on the baffle.

22. The electric pump-type packaging tube for toothpaste according to claim 1, further comprising a tube cover, a tube cap and a closing sheet; the tube cover comprises a lower cover and an upper cover, and the lower cover is hollow tubular shape with both ends open, and the upper cover and the tube cap are hollow tubular shape with one end open and the other end closed; the upper cover is rotatably connected with the lower cover, which is detachably connected with the nozzle segment; the tube cap is detachably connected with a connection part between the nozzle segment and the main body segment, and the closing sheet is detachably connected with the second end of the tail segment.

* * * * *